No. 739,446. PATENTED SEPT. 22, 1903.
E. REGER.
SUNSHADE.
APPLICATION FILED APR. 15, 1903.
NO MODEL. 2 SHEETS—SHEET 1.

Witnesses
E. Reger, Inventor,
by C. A. Snow & Co.
Attorneys

No. 739,446. PATENTED SEPT. 22, 1903.
E. REGER.
SUNSHADE.
APPLICATION FILED APR. 15, 1903.
NO MODEL. 2 SHEETS—SHEET 2.

Witnesses
E. Reger, Inventor
by C. A. Snow & Co.
Attorneys

No. 739,446. Patented September 22, 1903.

UNITED STATES PATENT OFFICE.

EDWARD REGER, OF HUTCHINSON, KANSAS.

SUNSHADE.

SPECIFICATION forming part of Letters Patent No. 739,446, dated September 22, 1903.

Application filed April 15, 1903. Serial No. 152,757. (No model.)

*To all whom it may concern:*

Be it known that I, EDWARD REGER, a citizen of the United States, residing at Hutchinson, in the county of Reno and State of Kansas, have invented a new and useful Sunshade, of which the following is a specification.

The object of the present invention is to provide an improved sunshade for use in connection with plows and various kinds of agricultural machinery and for use on wagons and other vehicles in which animal power is employed, with a view of protecting both the driver and the draft-animal.
A further object of the invention is to provide a sunshade which may be readily opened and closed by the driver, and when in closed position being out of the way, the flexible covering being carried by a horizontally-disposed supporting-frame arranged above the head of the driver.

A still further object of the invention is to provide a sunshade for the draft-animals in which the shade is so mounted as to turn as the animals turn and which will at all times remain over the animals and protect them from the rays of the sun.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
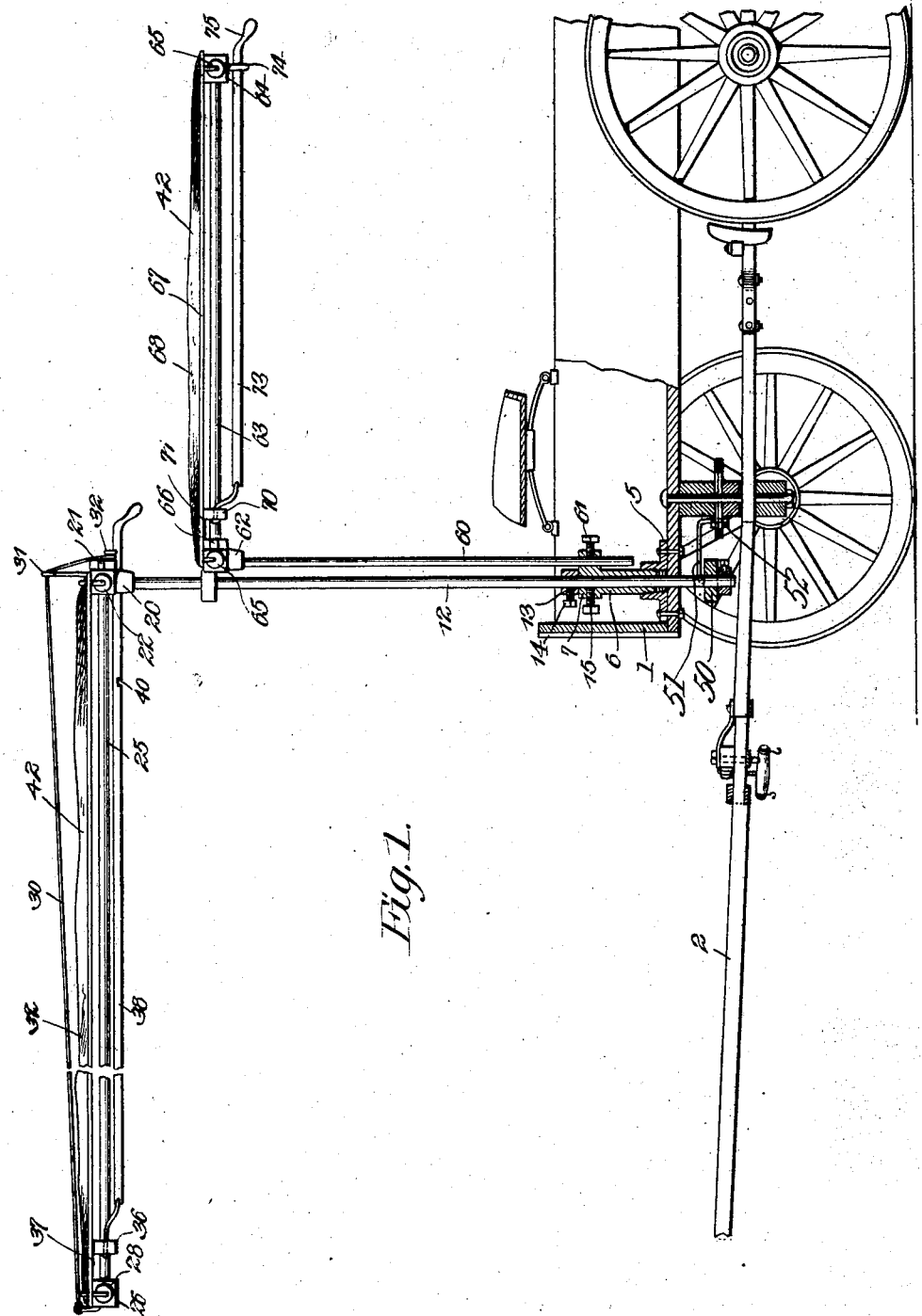
Figure 2:
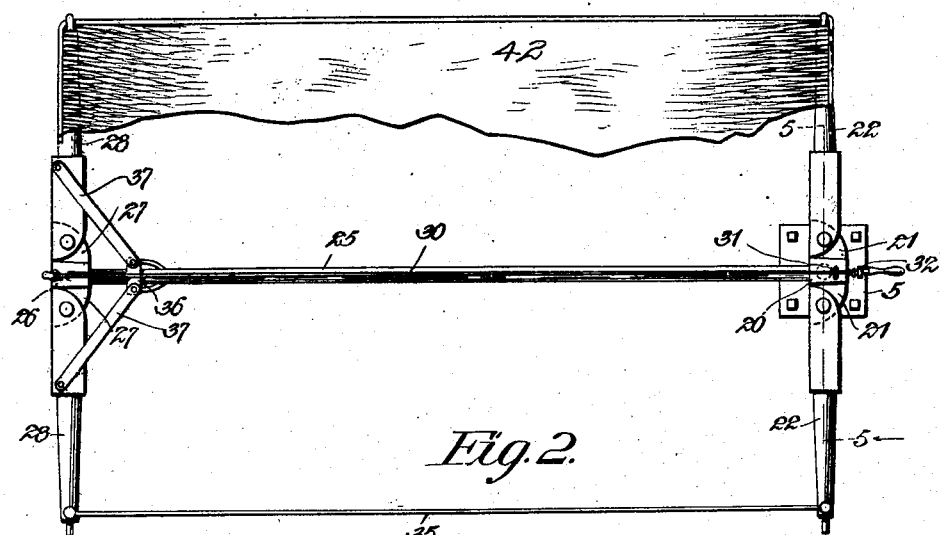
Figure 5:
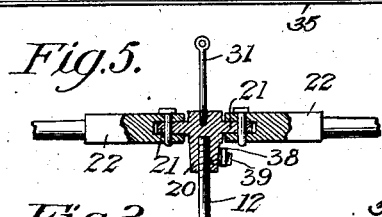
Figure 3:
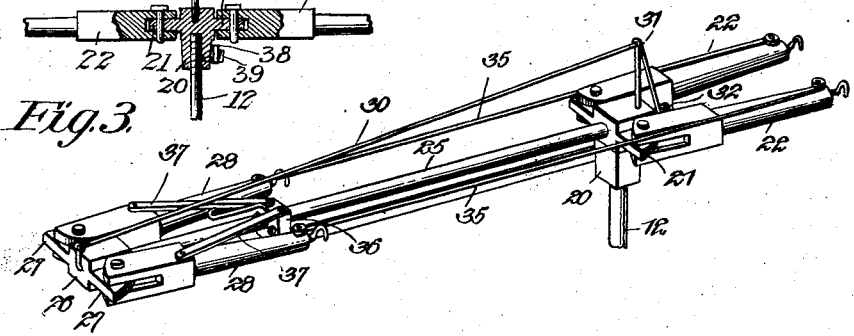
Figure 4:
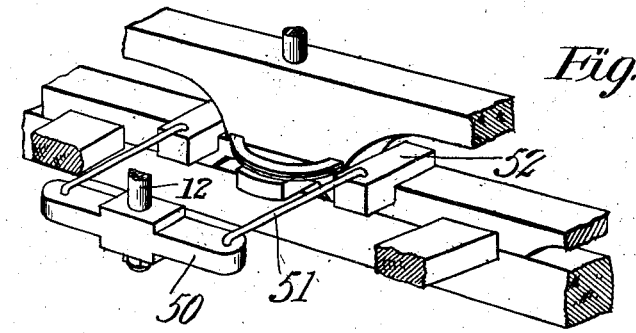

In the accompanying drawings, Figure 1 is a longitudinal sectional elevation of a sunshade constructed in accordance with the invention and showing the same as attached to the front end of a wagon or other vehicle. Fig. 2 is a plan view of a portion of the shade, the flexible covering being removed in order to more clearly illustrate the construction of the frame. Fig. 3 is a detail perspective view of one of the frames in closed position. Fig. 4 is a similar view of the means for connecting the lower portion of the animal-shade support to the wagon or machine. Fig. 5 is a transverse sectional elevation of a portion of the structure on the line 5 5 of Fig. 2.

Similar numerals of reference are employed to indicate corresponding parts throughout the several figures of the drawings.

The device is intended for application to any kind of machines or vehicles to which draft-animals are employed for motive power, and in the drawings 1 indicates a portion of the front of a wagon having a suitable tongue 2, these portions being designated in the claims as the "stationary" and "movable" members, respectively, in order that the claims may be read to include the relatively stationary frame and tongue or other movable member forming a part of an agricultural or other machine.

5 designates a suitable base-plate, having a centrally-disposed threaded opening for the reception of the threaded lower end of a hollow standard 6, the threaded connection permitting vertical adjustment of the standard with respect to the base.

The standard 6 is hollow and receives a vertically-disposed rod 12, on which is an adjustable collar 13, resting on the enlarged head of the standard 6 and serving as a support for maintaining the rod in its adjusted position, a screw 14 passing through a threaded opening in the collar and bearing against the surface of the rod in order to permit vertical adjustment of the latter. The enlarged head of the standard 6 is also provided with a set-screw 15, which may be forced into engagement with the rod to lock the same from rotative movement should it be desired to temporarily disengage the supporting-rod from its locking means and hold the same in stationary position. To the upper end of the rod 12 is secured a block 20, having a pair of oppositely-disposed lugs 21, on which are pivoted the bifurcated inner ends of spreader-arms 22, and the rear faces of the lugs, as well as the corresponding faces of the arms 22, are curved to permit folding movement of the arms, while contact of the end portions serves to limit outward movement and prevent any forward movement of the two arms beyond a straight line. This construction is clearly shown in Figs. 2 and 3.

Projecting from the forward face of the block 20 is a horizontally-disposed rod 25, carrying at its outer end a block 26, provided with lugs 27, to which are pivoted the bifurcated inner ends of a pair of arms 28, the construction of the arms and lugs being similar to that of the arms and lugs at the inner end of the structure. In order to properly support the outer block 26, a tension-rod 30 is connected at one end to said block and extends through an opening in the upper end of a standard 31, secured to the head-block 20, and thence passes to a securing device 32 at the rear face of said block. This rod acts as a truss in order to strengthen the structure. The outer ends of corresponding arms 22 and 28 are pivotally connected to links 35, so that both sets of arms are compelled to move simultaneously to open and closed positions.

On the rod 25 is mounted a sliding block or cross-head 36, connected by a pair of links 37 to an intermediate portion of the outer arms 28, and to this block 36 is connected the outer end of an operating-bar 38, the rear end of which passes through a guide 39, carried by the block 20, and terminates in a handle for convenience of the operator. The lower end of the rod 38 is provided with two notches 40, which may engage the lower portion of the guide in order to lock the frame in either open or closed positions, the bar 37 falling by gravity when the notches are in vertical alinement with the guard until said notches are properly engaged in the guide and the frame locked in the desired position. The frame carries a flexible covering 42, preferably of rectangular form to correspond to the shape of the frame when extended, and said covering is connected at its four corners to the outer ends of the several arms. When it is desired to extend the cover, the bar 37 is pushed in a forward direction, causing the arms to spread and stretch the flexible covering to its fullest extent, and the rear of the notches 40 then drops into engagement with the guiding device and holds the sunshade in extended position. The frame may be collapsed by a pulling strain on the bar 37, then contracting the arms, the flexible covering folding toward the central bar 25.

The lower end of the rod 12 is extended through the bottom of the wagon, and secured thereto is a transversely-disposed lever 50, the opposite ends of which are connected by rods 51 to a pair of lugs 52 carried, by the sand-board of the vehicle, the arrangement being such that as the draft animal or animals turn the sunshade will also turn and will always be in a position to protect the animals from the rays of the sun. The enlarged head of the standard 6, at the upper end of the same, is provided with a vertically-disposed opening for the reception of a rod 60, and in this enlarged head is a threaded opening to receive a clamping or set screw 61, which may engage the rod 60 and hold the latter in any position of vertical adjustment. To the upper end of the rod 60 is secured a block 62, having a forwardly-extended portion provided with an opening for the passage of the rod 12, the two rods 12 and 60 being thus connected together for mutual support. To the block 62 is a rearwardly-extending rod 63, having at its outer head a block 64, and both of the blocks 62 and 64 are provided with laterally-extending links 65, to which are pivoted the bifurcated inner ends of arms 66 of a construction similar to those forming a part of the front frame. The arms 62 and 64 are connected together in pairs by parallel rods 67, and to the outer ends of the rods are secured the corners of a flexible shield or cover 68, which may be opened or closed in the same manner as the front shade, and said shades may be opened and closed independently of each other. The rearwardly-extending rod is provided with a block or cross-head 70, connected by links 71 to forward arms 62, and to said block 70 is pivotally connected an operating-lever 73, adapted to a guide 74, depending from the rear block, said operating-lever terminating in a suitable handle 76 and being provided with notches or depressions for engaging the guide or the head-block, so that the frame may be readily locked in either open or closed positions.

The sunshade may be attached to vehicles or machines of any description, and as the operating-handles are within convenient reach of the driver the shades may be opened or closed as circumstances may require, the driver being protected from the rays of the sun, while the front shade, following the course of the animals, is always in position to protect the latter.

The construction and arrangement of the bar 12 may be modified in any suitable manner in accordance with the character of the machine to which it is to be connected and in some cases may be provided with a forwardly or rearwardly extending portion for connection with the tongue or other movable member of said vehicle or machine.

Having thus described the invention, what is claimed is—

1. An animal-shade for application to a vehicle having a front axle and adapted to project forward from the front of the vehicle to afford protection to the draft-animals, a shade-supporting rod, and means for connecting said rod to the axle to thereby turn the shade in accordance with the movements of the animal and in advance of the turning movement of the vehicle proper.

2. An animal-shade for application to a vehicle having a front axle turning with the draft-animals in advance of the completion of the turning movement of the vehicle proper, said shade extending in front of the vehicle to afford protection to the animals, a vertically-disposed rod connected to the rear end of the shade and forming the sole support therefor, and means for connecting the lower portion of said rod to the axle.

3. In a device of the class specified, an animal-shade, a vertically-disposed rod carrying said shade, means for attaching the rod to a movable member of a vehicle or machine, a standard having a vertical bore in which said rod is longitudinally adjustable, a collar carried by the rod and resting on the upper end of said standard to permit free rotative movement of the rod and a securing means carried by the collar and adapted to engage the rod and hold the latter in adjusted position.

4. The combination with an animal-shade, of a vertically-adjustable rod carrying said shade, means for securing the lower end of the rod to a movable member of a wagon or machine, means for clamping the rod in vertically-adjusted position, and means for locking said rod from rotative movement.

5. The combination with an animal-shade, of a vertically-adjustable rod supporting the shade, a standard having a vertical bore for the reception of said rod, means for securing the lower end of the rod to the movable member of a wagon or machine, a standard having a vertical guiding-opening for the reception of the rod, a collar encircling the rod and bearing on the upper end of said standard, a set-screw for locking the collar to the rod, and a second set-screw carried by the standard and serving to engage and lock the rod from rotative movement.

6. The combination in a sunshade, of a hollow standard having a laterally-extended upper portion, a rod vertically adjustable in said standard, a second rod parallel with the first and passing through an opening in the extended portion of the standard, a block secured to the upper end of the second rod and having a guiding-opening for the passage of the first rod, and a sunshade supported by each rod.

7. The combination in a sunshade, of a hollow standard, a vertically-adjustable rod extending therefrom, a second rod also adapted to a guiding-opening in the standard, a block secured to the upper end of the second rod and having a guiding-opening for the passage of the first rod, sunshades supported by the two rods, and means for connecting the first-named rod to the movable member of a machine or wagon to permit turning movement of said shade with the draft-animals.

In testimony that I claim the foregoing as my own I have hereto affixed my signature in the presence of two witnesses.

EDWARD REGER.

Witnesses:
H. O. MILLER,
D. R. MAGERS.